United States Patent [19]

Olsson

[11] 4,165,823
[45] Aug. 28, 1979

[54] DISPENSING APPARATUS

[76] Inventor: Carl F. S. Olsson, Kampastigen 4, S-352 52 Vaxjo, Sweden

[21] Appl. No.: 767,535

[22] Filed: Feb. 10, 1977

[30] Foreign Application Priority Data

Feb. 16, 1976 [SE] Sweden ............................. 7601681

[51] Int. Cl.² ........................................... G01F 11/24
[52] U.S. Cl. .................................... 222/252; 222/285; 222/368; 222/478; 198/608
[58] Field of Search ................ 222/194, 252, 285, 254, 222/368, 478; 198/608; 302/38

[56] References Cited

U.S. PATENT DOCUMENTS

| 899,640 | 9/1908 | Wangelin | 222/254 |
|---|---|---|---|
| 1,447,722 | 3/1923 | Henriksen | 222/252 |
| 2,644,724 | 7/1953 | Kronstad | 222/194 X |
| 3,498,505 | 3/1970 | Wirz | 222/254 |
| 3,656,661 | 4/1972 | Schumacher et al. | 222/194 |
| 3,920,116 | 11/1975 | Butler | 302/38 X |

Primary Examiner—David A. Scherbel
Assistant Examiner—Frederick R. Handren
Attorney, Agent, or Firm—Albert L. Jeffers; Roger M. Rickert

[57] ABSTRACT

A dispensing apparatus is provided for feeding an air containing material in such a way that a constant volume of solid material per unit of time is fed. Said apparatus comprising at a filling station a throwing device by means of which the material is thrown into compartments of a dispensing device whereby air is squeezed out of the material so that a constant volume of solid material is contained in each compartment. The compartments are successively moved to a discharge station wherein the compartments are emptied under influence of gravity and air under pressure blown into the compartment being emptied.

4 Claims, 2 Drawing Figures

DISPENSING APPARATUS

This invention relates to an apparatus for dispensing a material and more particularly for adjustable and continuous feeding of an air containing material in such a way that a constant volume of solid material is fed per unit of time.

DESCRIPTION OF THE PRIOR ART

For dispensing a material it is previously known to make use of a driven compartment wheel the compartments of which are displaced between a filling station wherein the compartments are filled with material, and a discharge station wherein the compartments are emptied. By uniformly filling the compartments and by adjusting the rotational speed of the wheel for obtaining the desired rate of movement of the compartments from the filling station to the discharge station, it is intended to provide for such a continuous feeding of the material to e.g. a processing machine, that a predetermined and constant amount of material per unit of time is fed to said processing machine. The described compartment wheel is a simple and inexpensive dispensing means which in many cases provides for an accurate feeding. By making use of the compartment wheel described for dispensing such a material that contains relatively large amounts of air, e.g. flocks of pulp or the like, it is, however, difficult to achieve the required accuracy of the volume of solid material fed per unit of time. This is due to the fact that the relationship between the solid material and the air of the filled compartments can vary and thus the quantity of solid material of the filled compartments of the wheel also can vary.

SUMMARY OF THE INVENTION

The object of this invention is to provide a dispensing apparatus which is particularly well suited for dispensing an air containing material and which comprises compartments movable between a material filling station and a material discharge station, said apparatus eliminating the above drawbacks and constantly delivering the preselected quantity of material as regards its volume of solid material per unit of time.

To meet with this object the dispensing apparatus according to the invention is characterized by a device provided at the material filling station for throwing the material into that compartment for the moment being situated at the material filling station in order to cause air to be squeezed out of the material and thereby to obtain a uniformity of the volume of solid material of each filled compartment.

In a preferred embodiment of the invention the device for throwing the material into the compartments comprises a rotatable disc provided with wings, said disc being centrally fed with material which under influence of the centrifugal force is compressed and thrown into the compartments.

Preferably the dispensing apparatus provided with compartments comprises a rotatable compartment wheel, the compartments of said wheel being at their ends spaced from the throwing device provided with openings for letting the air out of the compartments as they are filled with the material.

With the apparatus according to the invention and particularly with the preferred embodiment thereof there is, by the material being thrown into the compartments, provided a uniform compressing of the material therein and a hereby caused squeezing out of air from the material so that each compartment will contain a predetermined volume of solid material independently of the proportions of air and solid material of the material being fed to the throwing device. From this follows that there is a uniform material discharge from the dispensing apparatus as regards the volume of solid material discharged per unit of time.

BRIEF DESCRIPTION OF THE DRAWINGS

The invention will be described below with reference to the accompanying drawings in which.

DESCRIPTION OF THE PREFERRED EMBODIMENT

Figure 1:
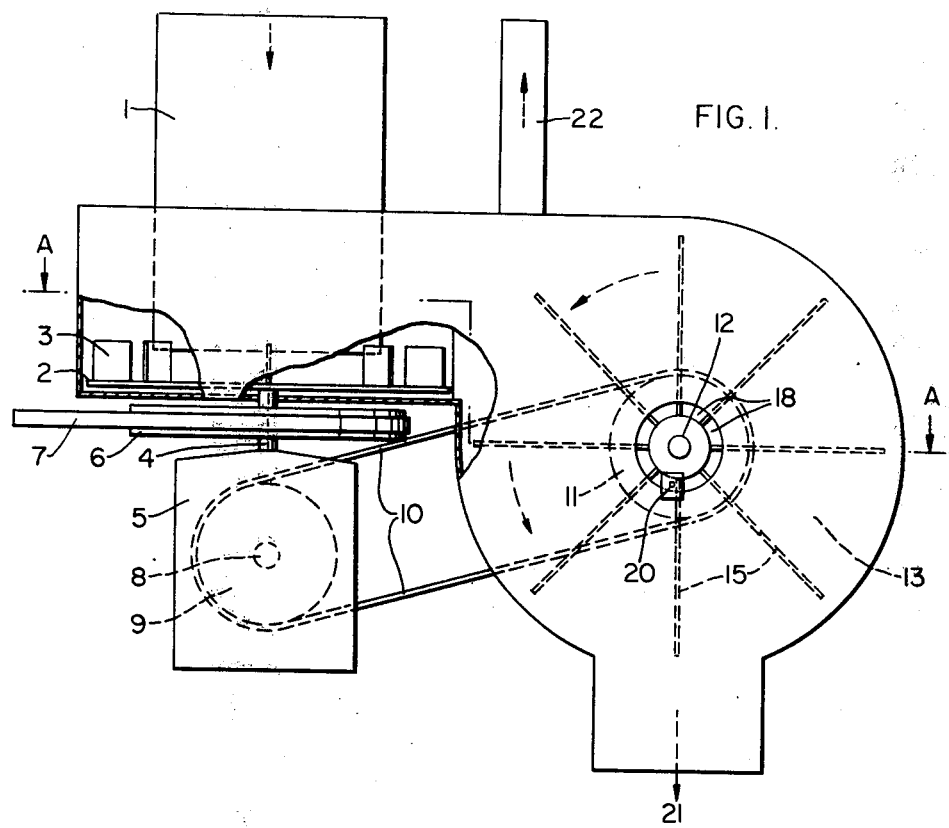
FIG. 1 shows a side elevation view of the dispensing apparatus.

The apparatus shown in the drawings is intended for feeding flocks of pulp from a scratching machine wherein bales of pulp are scratched apart to a flockulent, porous material consisting of a mixture of air and fibres or agglomerates of fibres to a machine for producing such products as disposable napkins or the like from said material. The dispensing apparatus according to the invention is designed for feeding to the producing machine the flockulent, porous material, hereinafter called flocks of pulp, in such a way that the volume of solid material fed per unit of time is maintained at a preselected value independently of the proportions of air and fibres of the material fed to the dispensing apparatus.

The flocks of pulp are fed through a feeder tube 1 from a scratching machine (not shown) to a central portion of a horizontally arranged disc 2. The vertical distance between the lower edge of the tube 1 and the disc is adjustable by lowering or raising the tube. This provides for a possibility to control the rate of feeding flocks of pulp onto the disc and to take into account the characteristics of the material fed and size of the fibres therein. The disc 2 is provided with conveyor means, e.g. wings 3, and is supported by a shaft 4 protruding from a gearing 5. The shaft 4 is provided with a toothed wheel 6 engaged by a toothed driving belt 7 which is in turn driven from a variable speed motor. Thus, when this motor (not shown) works the disc 2 will rotate. In the gearing 5 the shaft 4 is coupled to a driven shaft 8 which supports a toothed wheel 9. The toothed wheel 9 meshes with a toothed driving belt 10 which in turn meshes with and runs about another toothed wheel 11 fastened to a shaft 12. The shaft 12 supports a compartment wheel 13 which consists of a central tube 14 to which eight partition walls are fastened, said walls defining the compartments. The wheel 13 is provided with sides or end plates 16 and 17. The end plate 17 has a central aperture the diameter of which is greater than the diameter of the tube 14. Thus, at the central partion of the wheel 13 there is defined an annular slot through which there is established communication between the interior of the compartments and the ambient atmosphere. A housing 19 encloses the main part of the apparatus. The housing 19 is provided with an aperture the size and location of which coincide with those of the aperture in the end plate 17. A nozzle for air under pressure is provided on the housing and has such a location that air under pressure can flow from the nozzle through the slot 18 into the compartment wheel 13 at the bottom of the compartment for the moment opening downwards. In this downwardly opening position the compartments are aligned with a discharge opening 21 provided in the housing 19. The housing 19 has on its upper surface an air exhaust pipe 22 for the air squeezed out from the flocks of pulp when the dispensing apparatus is operating.

Figure 2:
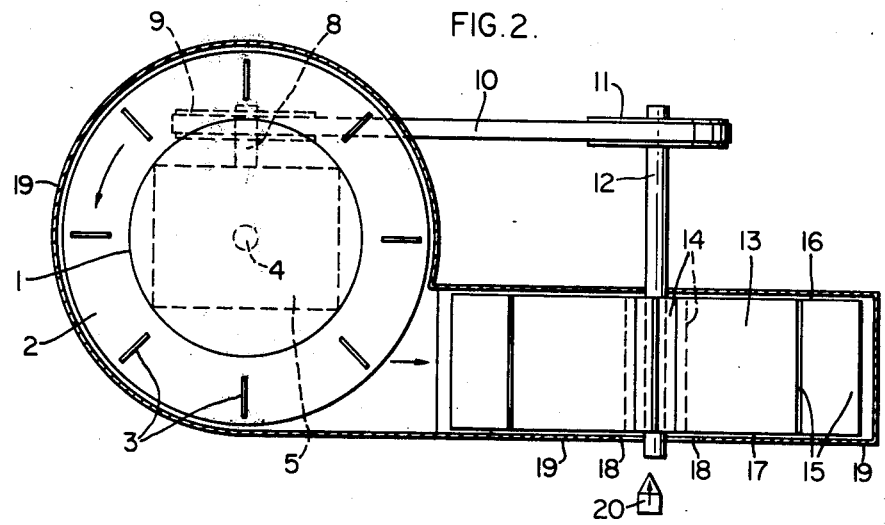
FIG. 2 shows a horizontal section on line A—A in FIG. 1

Flocks of pulp are fed into the apparatus through the feeder tube 1 and are under influence of suction and gravity moved downwards against the disc 2, said disc rotating in a counter-clockwise direction as is shown in FIG. 2. Under influence of the centrifugal force thus created the flocks of pulp are thrown outwards towards the periphery of the disc where the flocks are engaged by the wings 3, imparting high velocity to the flocks and throwing them into the compartments of the compartment wheel 13. As is shown in FIG. 1, the compartment wheel is rotating in a counter-clockwise direction at a rotational speed which is low as compared with the rotational speed of the disc. It is realized that the ratio of rotational speeds of the disc 2 and the compartment wheel is determined by the gearing 5 and by the diameters of the toothed wheels 8, 9, 10, and 11.

It is possible to change the relative rotational speed of the disc and the compartment wheel without exchanging the gearing 5 for another one. Such a change of relative rotational speed can be achieved by varying the relative sizes of the toothed wheels 9 and 11.

The center of the compartment wheel 13 is located at a lower level than the upper surface of the disc 2 to which the flocks of pulp are fed. This arrangement facilitates the filling of the compartments. Further, the filling is facilitated thereby that the air contained in the compartments before filling them can escape through the slot 18 at the bottom portions of the compartments.

The rotation imparted to the flocks of pulp by the disc 2 results in a uniform compressing of and squeezing out air from the flocks of pulp and this compressing is completed when the flocks of pulp are thrown against the compartment walls of the compartment wheel. Thus, those flocks of pulp which in every moment fill a compartment will have a constant volume of solid material independently of the proportions of air and fibres in the flocks of pulp fed to the apparatus via the feeder tube 1. It is realized that by means of the apparatus according to the invention, it is possible to control not only the quantity of solid material discharged per unit of time from the apparatus but as well the ratio of air and fibres of the material discharged therefrom.

By the above described compressing and throwing of the flocks of pulp into the compartments there is created the necessary prerequisite of giving the apparatus ability to discharge a constant but controllable volume of solid material per unit of time. The squeezed out air is collected in the upper portion of the housing 19 from where the air is exhausted through the exhaust pipe 22.

When the compartment which in each case has been filled is moved downwards to its location above the discharge opening 21, air under pressure is blown into the inner portion of that compartment through the annular slot 18 whereby a fast discharge of material is obtained. Thus, the slot 18 has the double purpose of making it possible for the air to escape from the compartments as these are filled and making it possible to supply air under pressure for facilitating discharging of material from the compartments.

The invention can be modified within the scope of the following claims. This, it is not necessary that the compartments are provided by a compartment wheel. It is, of course, also possible to design the apparatus for dispensing other materials than flocks of pulp.

I claim:

1. Apparatus for squeezing air from and compressing an air-containing, flockulent material to form successive constant volume units of compressed material and thereafter successively dispensing said units comprising, a centrifugal throwing device having an inlet for continuously feeding the flockulent material thereto, an outlet, a rotatable element having impelling means thereon for contrifugally throwing said material at high velocity out of said outlet, and first means for driving said rotatable element; and a dispensing device including a housing having an inlet communicating directly with said throwing device outlet and a dispensing outlet, a movable conveying element in said housing having at least two compartments of predetermined volume, and second means for driving said conveying element successively to position one compartment in direct communication with said last-named inlet and the other compartment in direct communication with said dispensing outlet, said throwing device being arranged forcefully to throw said material directly into said one compartment thereby squeezing air from said material and compressing the same to form a constant volume unit of material therein, said unit being thereafter dispensed from said dispensing outlet, said housing having an upper portion over said movable element for accumulating air squeezed from said material, said housing portion having a vent opening therein for discharging said accumulated air.

2. The apparatus of claim 1 wherein said rotatable element is a horizontal disc, said impelling means being adjacent the periphery of said disc, said throwing device inlet comprising a feeder pipe having a discharge end spaced above said disc, and further comprising means for adjusting the spacing between said discharge end and said disc.

3. The apparatus of claim 1 wherein said rotatable element is a horizontal disc having a vertical axis of rotation, said conveying element being rotatable and vertically disposed with a horizontal axis of rotation, said disc and said throwing device outlet being at a higher level than said axis of rotation of said second element.

4. The apparatus of claim 1 wherein said conveying element is rotatable, and further comprising means coupled to said first and second driving means for rotating said conveying element at a rotational speed relatively low with respect to the rotational speed of said rotatable element.

* * * * *

UNITED STATES PATENT AND TRADEMARK OFFICE
CERTIFICATE OF CORRECTION

PATENT NO. : 4,165,823
DATED : August 28, 1979
INVENTOR(S) : CARL F. S. OLSSON

It is certified that error appears in the above-identified patent and that said Letters Patent are hereby corrected as shown below:

Col. 2, line 46, "(not shown)." should be on line 45 after "motor".

Col. 2, line 53, "partitition" should be -- partition --.

Col. 2, line 57, "partion" should be -- portion --.

Col. 2, line 64, "20" should be after "nozzle"

Col. 4, line 7, "This" should be -- Thus --.

Claim 1, Col. 4, line 15, "," should be -- : --

Claim 1, Col. 4, line 19, Change "contrifugally" to -- centrifugally --.

Signed and Sealed this

Twentieth Day of November 1979

[SEAL]

Attest:

RUTH C. MASON
Attesting Officer

LUTRELLE F. PARKER
Acting Commissioner of Patents and Trademarks